(12) United States Patent
Miwa et al.

(10) Patent No.: US 9,254,756 B2
(45) Date of Patent: Feb. 9, 2016

(54) POWER SUPPLY DEVICE AND POWER SUPPLY METHOD

(75) Inventors: Koji Miwa, Susono (JP); Takashi Kawai, Gotemba (JP); Shinji Ichikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 148 days.

(21) Appl. No.: 14/351,960

(22) PCT Filed: Oct. 18, 2011

(86) PCT No.: PCT/JP2011/073888
§ 371 (c)(1),
(2), (4) Date: Apr. 15, 2014

(87) PCT Pub. No.: WO2013/057786
PCT Pub. Date: Apr. 25, 2013

(65) Prior Publication Data
US 2014/0300316 A1    Oct. 9, 2014

(51) Int. Cl.
*H02J 7/00* (2006.01)
*B60L 11/18* (2006.01)
*G06Q 30/04* (2012.01)
*G06Q 50/06* (2012.01)

(52) U.S. Cl.
CPC .......... *B60L 11/1848* (2013.01); *B60L 11/182* (2013.01); *G06Q 30/04* (2013.01); *G06Q 50/06* (2013.01); *Y02E 40/76* (2013.01); *Y04S 10/545* (2013.01); *Y04S 50/12* (2013.01)

(58) Field of Classification Search
CPC ..... Y02T 90/122; H02J 7/025; B60L 11/1838
USPC .......................................................... 320/108
See application file for complete search history.

(56) References Cited

U.S. PATENT DOCUMENTS

| | | | |
|---|---|---|---|
| 2009/0101421 A1 | 4/2009 | Oyobe et al. | |
| 2009/0156268 A1 | 6/2009 | Kim et al. | |
| 2011/0109263 A1* | 5/2011 | Sakoda | B60L 11/182 320/108 |
| 2012/0086396 A1* | 4/2012 | Pan | B60L 11/1838 320/109 |
| 2012/0116255 A1* | 5/2012 | Wang | G01L 7/086 600/587 |

FOREIGN PATENT DOCUMENTS

| | | |
|---|---|---|
| JP | A-7-8918 | 1/1995 |
| JP | A-2005-197052 | 7/2005 |
| JP | A-2006-345588 | 12/2006 |
| JP | A-2007-62638 | 3/2007 |

(Continued)

*Primary Examiner* — Edward Tso
*Assistant Examiner* — Johali Torres Ruiz
(74) *Attorney, Agent, or Firm* — Oliff PLC

(57) ABSTRACT

A power supply device which performs power supply from an outside to a vehicle includes: a power source section for performing the power supply to the vehicle; and a control device that performs control of the power source section. The control device obtains information about power reception efficiency of the vehicle as an object of the power supply and determines a power reception efficiency range and a fee that correspond to the obtained information from a plurality of power reception efficiency ranges and plurality of fees that are set corresponding to the plurality of power reception efficiency ranges. The power supply device preferably further includes a power transmission section for receiving the power from the power source section and contactlessly performing power transmission to the vehicle.

9 Claims, 10 Drawing Sheets

(56) References Cited

FOREIGN PATENT DOCUMENTS

| JP | 2008-305009 A | 12/2008 |
| JP | A-2009-148151 | 7/2009 |
| JP | A-2010-115032 | 5/2010 |
| JP | A-2011-189895 | 9/2011 |
| JP | A-2011-205829 | 10/2011 |

* cited by examiner

FIG. 7
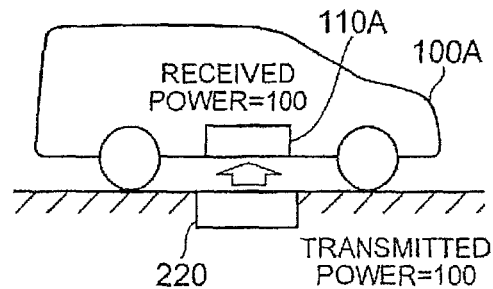
FIG. 8
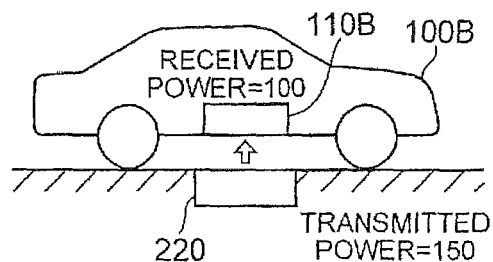
FIG. 9
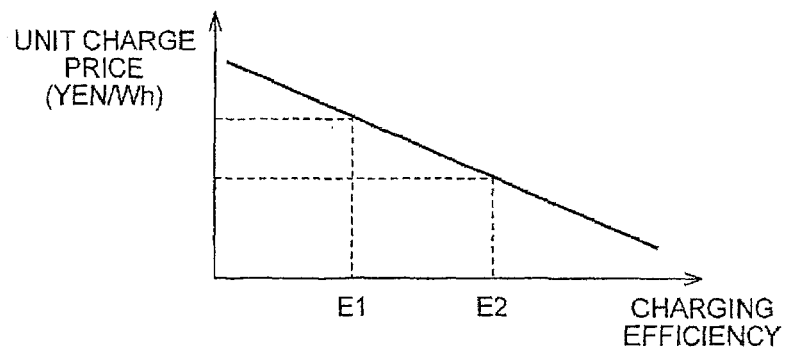
FIG. 10
| RANK | UNIT PRICE |
|---|---|
| R(A)(90~100%) | 0.020YEN/Wh |
| R(B)(80~ 90%) | 0.025YEN/Wh |
| R(C)( ~ 80%) | 0.030YEN/Wh |

POWER SUPPLY DEVICE AND POWER SUPPLY METHOD

TECHNICAL FIELD

The present invention relates to a power supply device and a power supply method and particularly to a power supply device and a power supply method in which power supply is performed to a vehicle from an outside.

BACKGROUND ART

Recently, electric vehicles and hybrid vehicles that travel with electric energy instead of fuel or in addition to fuel have been attracting attention in order to reduce carbon dioxide exhausted from automobiles to prevent global warming. Among hybrid vehicles, plug-in hybrid vehicles have been produced that are configured such that an installed battery can be charged with electric energy from an outside of the vehicle.

Japanese Patent Application Publication No. 2007-62638 (JP 2007-62638 A) (Patent Document 1) discloses a hybrid vehicle in which the battery can be charged from the outside of the vehicle and that can be expected to reduce a power cost.

PRIOR ART DOCUMENTS

Patent Documents

Patent Document 1: Japanese Patent Application Publication No. 2007-62638 (JP 2007-62638 A)
Patent Document 2: Japanese Patent Application Publication No. 2010-115032 (JP 2010-115032 A)
Patent Document 3: Japanese Patent Application Publication No. 2006-345588 (JP 2006-345588 A)
Patent Document 4: Japanese Patent Application Publication No. 2009-148151 (JP 2009-148151 A)

SUMMARY OF THE INVENTION

Problem to be Solved by the Invention

Commonly, a uniform unit price is set for consumed power when payment is made for power used for outside charging. In other words, an electricity fee is billed not for electric energy that is charged to the vehicle but electric energy that is consumed by an outside charging device.

However, when the uniform unit price is set for the power that is used for the charging, a charging cost may largely fluctuates in each time due to fluctuation of charging efficiency to the vehicle. For example, an increase in loss due to aging degradation of the charging device and a power storage device can be considered as a cause. Further, contactless charging for reducing charging time has been studied. However, in such a case, the charging efficiency may fluctuate due to a mismatch between a power transmission section and a power reception section, interposition of an object, sand, snow or the like between the power transmission section and the power reception section, or the like.

An object of the present invention is to provide a power supply device and a power supply method that reduce non-uniformity in a power cost on a user side.

Means for Solving the Problem

The present invention is, in summary, a power supply device which performs power supply from an outside to a vehicle, the power supply device including: a power source section for performing the power supply to the vehicle; and a control device that performs control of the power source section. The control device obtains information about power reception efficiency of the vehicle as an object of the power supply and determines a power reception efficiency range and a fee that correspond to the obtained information from a plurality of power reception efficiency ranges and a plurality of fees that are set corresponding to the plurality of power reception efficiency ranges.

The power supply device preferably further includes a power transmission section for receiving the power from the power source section and contactlessly performing power transmission to the vehicle.

The power transmission section is more preferably configured such that a difference in a natural frequency from a power reception section of the vehicle falls within ±10%.

A coupling coefficient between the power reception section of the vehicle and the power transmission section is more preferably 0.1 or smaller.

The power transmission section more preferably transmits the power to the power reception section through either one of a magnetic field that is formed between the power reception section of the vehicle and the power transmission section and vibrates at a specified frequency and an electric field that is formed between the power reception section and the power transmission section and vibrates at a specified frequency.

The control device preferably obtains as the information any of power reception efficiency in execution of temporary energization, a mismatch amount between a power transmission section and a power reception section in a case where contactless charging is performed, presence or absence of an object interposed between the power transmission section and the power reception section in a case where the contactless charging is performed, and aging degradation information about the vehicle and calculates power reception efficiency in power supply according to the obtained information.

The control device preferably informs an operator of the vehicle of the determined fee.

The control device preferably informs an operator of the vehicle of the determined fee, starts the power supply to the vehicle if the operator of the vehicle approves the determined fee, and stops the power supply to the vehicle if the operator of the vehicle does not approve the determined fee.

Another aspect of the present invention is a power supply method of performing power supply from an outside to a vehicle, the power supply method including the steps of: obtaining information about power reception efficiency of a vehicle as an object of the power supply; and determining a power reception efficiency range and a fee that correspond to the obtained information from a plurality of power reception efficiency ranges and a plurality of fees that are set corresponding to the plurality of power reception efficiency ranges.

Yet another aspect of the present invention is a power reception device which receives power from a power supply device, the power reception device including: a power reception section that receives the power from the power supply device; and a control device that performs control of the power reception section. The control device obtains information about power reception efficiency of a vehicle as an object of the power supply and determines a power reception efficiency range and a fee that correspond to the obtained information from a plurality of power reception efficiency ranges and a plurality of fees that are set corresponding to the plurality of power reception efficiency ranges.

The power reception device according to claim 10 is preferably the power reception section that contactlessly receives the power from the power supply device.

The power reception section is more preferably configured such that a difference in a natural frequency from a power transmission section of the power supply device falls within ±10%.

A coupling coefficient between the power reception section and a power transmission section of the power supply device is more preferably 0.1 or smaller.

A power transmission section of the power supply device more preferably transmits the power to the power reception section through either one of a magnetic field that is formed between the power reception section and the power transmission section and vibrates at a specified frequency and an electric field that is formed between the power reception section and the power transmission section and vibrates at a specified frequency.

The control device preferably obtains as the information any of power reception efficiency in execution of temporary energization, a mismatch amount between a power transmission section and a power reception section in a case where contactless charging is performed, presence or absence of an object interposed between the power transmission section and the power reception section in a case where the contactless charging is performed, and aging degradation information about the vehicle and calculates power reception efficiency in power supply according to the obtained information.

The control device preferably informs an operator of the vehicle of the determined fee.

The control device preferably informs an operator of the vehicle of the determined fee, allows staring of the power supply to the vehicle if the operator of the vehicle approves the determined fee, and allows stopping of the power supply to the vehicle if the operator of the vehicle does not approve the determined fee.

Still another aspect of the present invention is a power transmission-reception system including: a power supply device that performs power supply from an outside to a vehicle; a power reception device that is installed in the vehicle and receives supply of power from the power supply device; and a control device that performs control related to power transmission from the power supply device to the power reception device. The control device obtains information about power reception efficiency of the vehicle as an object of the power supply and determines a power reception efficiency range and a fee that correspond to the obtained information from a plurality of power reception efficiency ranges and a plurality of fees that are set corresponding to the plurality of power reception efficiency ranges.

Effect of the Invention

According to the present invention, nonuniformity in a fee paid by a user when the user receives supply of power from a power supply device is reduced, thus facilitating understanding of the user.

BRIEF DESCRIPTION OF THE DRAWINGS

FIG. 7 is a diagram of a first example for illustrating nonuniformity in received power.

FIG. 8 is a diagram of a second example for illustrating the nonuniformity in the received power.

FIG. 9 is a graph for illustrating evaluation examples of a unit charge price.

FIG. 10 is a first diagram for illustrating the unit charge price that is applied in this embodiment.

MODES FOR CARRYING OUT THE INVENTION

Figure 1:
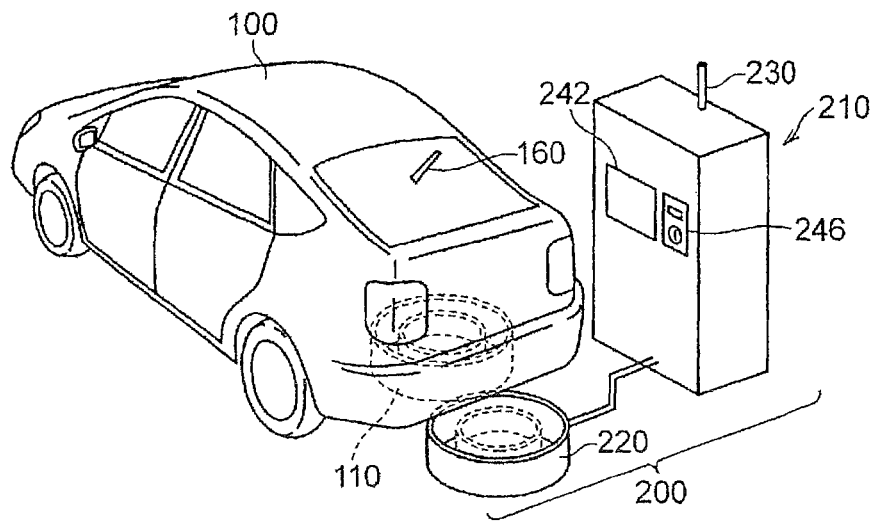
FIG. 1 is a general configuration diagram of a power transmission-reception system in accordance with an embodiment of the present invention.

An embodiment of the present invention will hereinafter be described in detail with reference to drawings. The same or correspondent sections in the drawings will be provided with the same reference numerals and symbols, and a description thereof will not be repeated.

FIG. 1 is a general configuration diagram of a power transmission-reception system in accordance with an embodiment of the present invention.

Referring to FIG. 1, a power transmission-reception system 10 includes a vehicle 100 and power transmission device 200. The vehicle 100 includes a power reception section 110 and a communication section 160.

The power reception section 110 is configured to be arranged on a bottom surface of a vehicle body and contactlessly receive power transmitted from a power transmission section 220 of the power transmission device 200. Specifically, the power reception section 110 includes a self-resonance coil (also referred to as resonance coil) described below and resonates with a self-resonance coil included in the power transmission section 220 via an electromagnetic field to contactlessly receive power from the power transmission section 220. The communication section 160 is a communication interface for performing communication between the vehicle 100 and the power transmission device 200.

The power transmission device 200 includes a charging stand 210 and the power transmission section 220. The charging stand 210 includes a display section 242, a fee reception section 246, and a communication section 230. The charging stand 210 converts commercial alternate current power to high-frequency power, for example, and outputs the power to the power transmission section 220. The charging stand 210 may receive power supply from a power source device such as a solar power generation device or a wind power generation device.

The power transmission section 220 is configured to be arranged on a floor surface of a parking lot, for example, and contactlessly transmit the high-frequency power that is supplied from the charging stand 210 to the power reception section 110 of the vehicle 100. Specifically, the power transmission section 220 includes the self-resonance coil. The self-resonance coil resonates with the self-resonance coil included in the power reception section 110 via the electromagnetic field. The power transmission section 220 thereby contactlessly transmits the power to the power reception section 110. The communication section 230 is a communication interface for performing communication between the power transmission device 200 and the vehicle 100.

Here, when the power is supplied from the power transmission device 200 to the vehicle 100, it is required to guide the vehicle 100 to the power transmission device 200 and perform alignment between the power reception section 110 of the vehicle 100 and the power transmission section 220 of the power transmission device 200. In other words, the alignment is not easy for the vehicle 100. A portable apparatus would easily be put in an appropriate position in a power supply unit such as a charging apparatus if a user manually carried the apparatus. However, it is impossible to manually carry the vehicle to adjust its position, and the user is required to operate the vehicle to stop the vehicle at an appropriate position.

Accordingly, it is desirable that a procedure which is highly tolerant of mismatch is adopted for the power supply from the power transmission device 200 to the vehicle 100. It is said that an electromagnetic induction procedure is for short sending distance and has low tolerance for mismatch. Adoption of the electromagnetic induction procedure to the power supply to the vehicle may require a highly accurate driving technique of a driver during parking, installation of a highly accurate vehicle guidance device in the vehicle, or a movable section that moves a coil position to manage an inaccurate parking position.

It is said that a resonance procedure by the electromagnetic field can send relatively large power even when the sending distance is several meters and in general has higher tolerance for the mismatch than the electromagnetic induction procedure. Therefore, in the power transmission-reception system 10 in accordance with this embodiment, the power supply from the power transmission device 200 to the vehicle 100 is performed by using the resonance method.

In the power transmission-reception system in accordance with this embodiment, the natural frequency of the power transmission section and the natural frequency of the power reception section are the same natural frequency.

The "natural frequency of the power transmission section" means a vibration frequency in a case where an electric circuit that includes the coil and a capacitor of the power transmission section makes a free vibration. A "resonance frequency of the power transmission section" means the natural frequency in a case where a braking force or electrical resistance becomes zero in the electric circuit that includes the coil and the capacitor of the power transmission section.

Similarly, the "natural frequency of the power reception section" means a vibration frequency in a case where an electric circuit that includes the coil and a capacitor of the power reception section makes a free vibration. Further, a "resonance frequency of the power reception section" means the natural frequency in a case where the braking force or electrical resistance becomes zero in the electric circuit that includes the coil and the capacitor of the power reception section.

In this specification, "the same natural frequency" includes not only a case where the frequencies are perfectly the same but also a case where the frequencies are substantially the same. "The natural frequencies are substantially the same" means a case where the difference between the natural frequency of the power transmission section and the natural frequency of the power reception section falls within 10% of the natural frequency of the power transmission section or the natural frequency of the power reception section.

Figure 2:
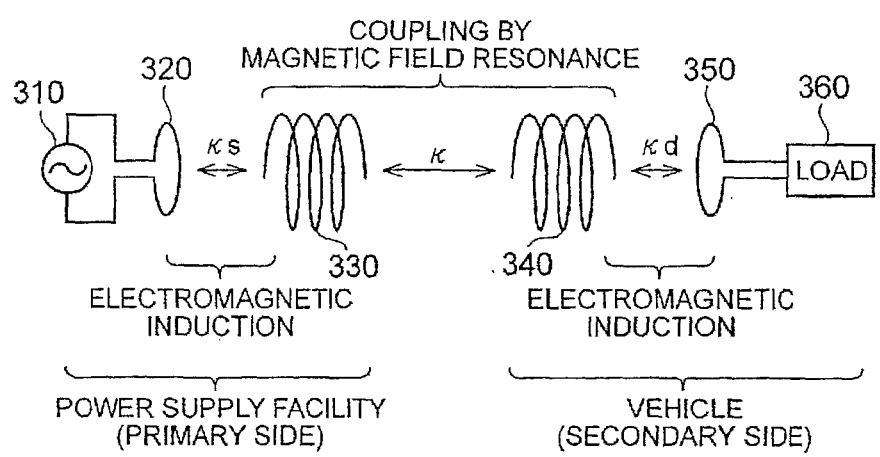
FIG. 2 is a diagram for illustrating a principle of power transmission by a resonance method.

FIG. 2 is a diagram for illustrating a principle of power transmission by the resonance method.

Referring to FIG. 2, the resonance method uses resonance between two LC resonance coils that have the same natural frequency in the electromagnetic field (near field), which is similar to resonance between two tuning forks, to transfer the power from one of the coils to the other via the electromagnetic field.

Specifically, a primary coil 320 is connected to a high-frequency power source 310, and the high-frequency power is supplied to a primary self-resonance coil 330 that is magnetically coupled to the primary coil 320 by electromagnetic induction. The primary self-resonance coil 330 is an LC resonator that uses an inductance of the coil itself and a stray capacitance and resonates with a secondary self-resonance coil 340 that has the same resonance frequency as the primary self-resonance coil 330 via the electromagnetic field (near field). Then, energy (power) moves from the primary self-resonance coil 330 to the secondary self-resonance coil 340 via the electromagnetic field. The energy (power) moved to the secondary self-resonance coil 340 is taken out by a secondary coil 350 that is magnetically coupled to the secondary self-resonance coil 340 by the electromagnetic induction and is supplied to a load 360. The power transmission by the resonance method is achieved when a Q value that represents resonance strength between the primary self-resonance coil 330 and the secondary self-resonance coil 340 is larger than 100, for example.

Further, in the power transmission-reception system in accordance with this embodiment, the power is transmitted from the power transmission section to the power reception section by making the power transmission section and the power reception section resonate (resonate) by the electromagnetic field, a coupling coefficient between the power transmission section ($\kappa$) and the power reception section is 0.1 or smaller. In common power transfer that uses the electromagnetic induction, the coupling coefficient ($\kappa$) between the power transmission section and the power reception section is close to 1.0.

Explaining the correspondence to FIG. 1, the secondary self-resonance coil 340 and the secondary coil 350 correspond to the power reception section 110 in FIG. 1, and the primary coil 320 and the primary self-resonance coil 330 correspond to the power transmission section 220 in FIG. 1.

Figure 3:
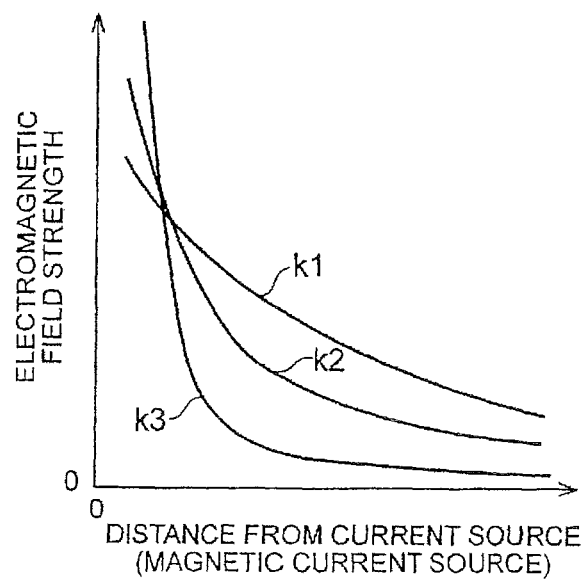
FIG. 3 is a graph that represents a relationship between a distance from a current source (magnetic current source) and strength of an electromagnetic field.

FIG. 3 is a graph that represents a relationship between a distance from a current source (magnetic current source) and strength of the electromagnetic field.

Referring to FIG. 3, the electromagnetic field includes three components. A curve k1 is a component that is inversely proportional to the distance from the wave source and is referred to as "radiant electromagnetic field". A curve k2 is a component that is inversely proportional to the square of the distance from the wave source and is referred to as "induction electromagnetic field". Further, a curve k3 is a component that is inversely proportional to the cube of the distance from the wave source and is referred to as "static electromagnetic field".

There is an area among those where the strength of an electromagnetic wave rapidly decreases according to the distance from the wave source. The resonance method uses the near field (evanescent field) to transfer the energy (power). In other words, the near field is used to make a pair of resonators that have the same natural frequency (for example, the pair of LC resonance coils) resonate, and the energy (power) is thereby transferred from one of the resonators (the primary self-resonance coil) to the other of the resonators (the secondary self-resonance coil). Because the near field does not propagate the energy (power) to a distant location, the resonance method can transmit the power with less energy loss than the electromagnetic wave that transfers the energy (power) by the "radiant electromagnetic field" that propagates the energy to the distant location.

Figure 4:
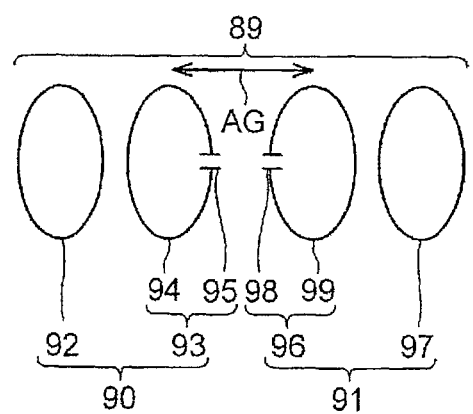
FIG. 4 is a diagram that illustrates a simulation model of a power transfer system.
Figure 5:
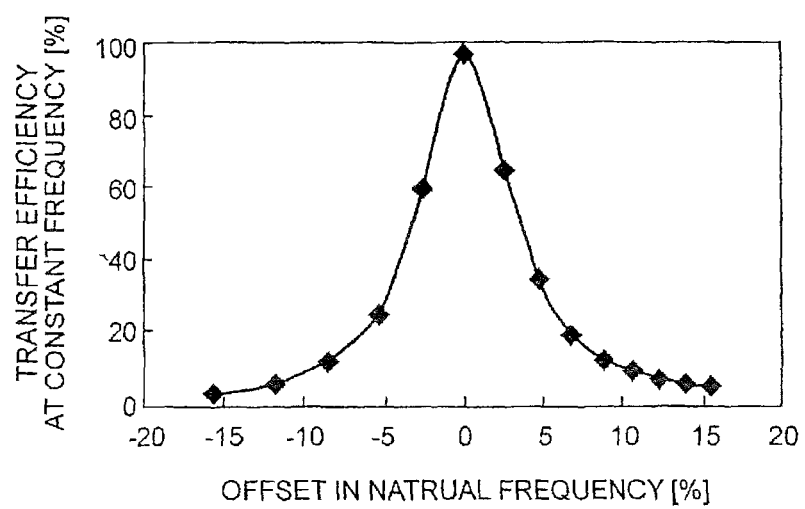
FIG. 5 is a graph that represents a relationship between an offset in natural frequency between a power transmission device and a power reception device and efficiency.

Using FIG. 4 and FIG. 5, a simulation result of an analysis of a relationship between a difference in the natural frequency and power transfer efficiency will be described. FIG. 4 is a diagram that illustrates a simulation model of a power transfer system. Further, FIG. 5 is a graph that represents a relationship between an offset in the natural frequency between the power transmission device and the power reception device and the power transfer efficiency.

Referring to FIG. 4, a power transfer system 89 includes a power transmission section 90 and a power reception section 91. The power transmission section 90 includes a first coil 92 and a second coil 93. The second coil 93 includes a resonance coil 94 and a capacitor 95 that is connected to the resonance coil 94. The power reception section 91 includes a third coil 96 and a fourth coil 97. The third coil 96 includes a resonance coil 99 and a capacitor 98 that is connected to the resonance coil 99.

An inductance of the resonance coil 94 will be referred to as inductance Lt, and a capacitance of the capacitor 95 will be referred to as capacitance C1. Further, an inductance of the resonance coil 99 will be referred to as inductance Lr, and a capacitance of the capacitor 98 will be referred to as capacitance C2. When each parameter is set as described above, a natural frequency f1 of the second coil 93 is expressed by the following equation (1), and a natural frequency f2 of the third coil 96 is expressed by the following equation (2).

$$f1 = 1/\{2\pi(Lt \times C1)^{1/2}\} \quad (1)$$

$$f2 = 1/\{2\pi(Lr \times C2)^{1/2}\} \quad (2)$$

Here, FIG. 5 shows the relationship between the offset in the natural frequency between the second coil 93 and the third coil 96 and the power transfer efficiency in a case where the inductance Lr and the capacitances C1, C2 are fixed and only the inductance Lt is changed. In the simulation, a relative positional relationship between the resonance coil 94 and the resonance coil 99 is fixed, and a frequency of current that is supplied to the second coil 93 is constant.

In the graph shown in FIG. 5, a horizontal axis represents the offset in the natural frequency (%), and a vertical axis represents the power transfer efficiency (%) at the constant frequency. The offset in the natural frequency (%) is expressed by the following equation (3).

$$(\text{Offset in natural frequency}) = \{(f1-f2)/f2\} \times 100(\%) \quad (3)$$

As it is clear from FIG. 5, when the offset in the natural frequency (%) is 0%, the power transfer efficiency is close to 100%. When the offset in the natural frequency (%) is ±5%, the power transfer efficiency is approximately 40%. When the offset in the natural frequency (%) is ±10%, the power transfer efficiency is approximately 10%. When the offset in the natural frequency (%) is ±15%, the power transfer efficiency is approximately 5%. In other words, it can be understood that the natural frequencies of the second coil 93 and the third coil 96 are set such that an absolute value of the offset in the natural frequency (%) (a difference in the natural frequency) falls in a range of 10% or lower of the natural frequency of the third coil 96 and the power transfer efficiency can thereby be increased to a practical level. In addition, it is more preferable that the power transfer efficiency can further be increased when the natural frequencies of the second coil 93 and the third coil 96 are set such that the absolute value of the offset in the natural frequency (%) falls in a range of 5% or lower of the natural frequency of the third coil 96. Electromagnetic field analysis software (JMAG (registered trademark): JSOL Corporation) is employed as simulation software.

Figure 6:
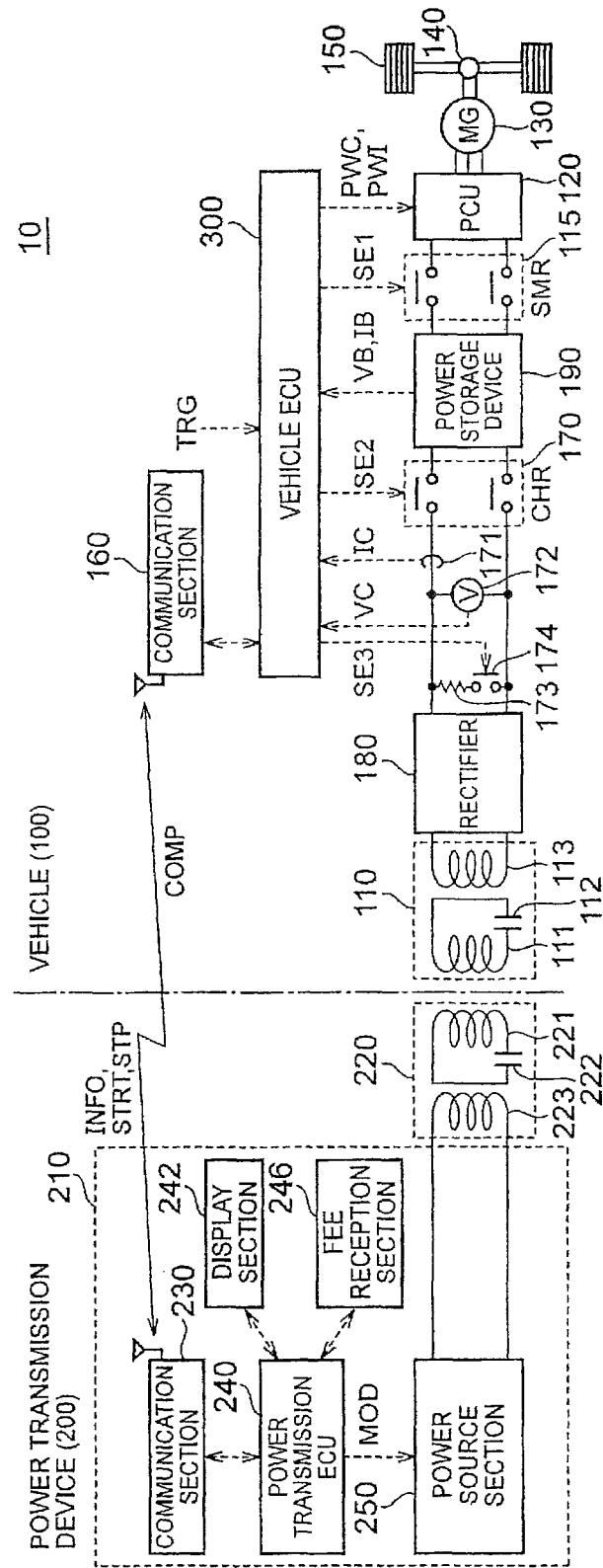
FIG. 6 is a detailed configuration diagram of a power transmission-reception system 10 shown in FIG. 1.

FIG. 6 is a detailed configuration diagram of the power transmission-reception system 10 shown in FIG. 1. Referring to FIG. 6, the vehicle 100 includes, in addition to the power reception section 110 and the communication section 160, a rectifier 180, a charge relay (CHR) 170, a power storage device 190, a system main relay (SMR) 115, a power control unit PCU (Power Control Unit) 120, a motor-generator 130, a drive power transmission gear 140, a drive wheel 150, a vehicle ECU (Electronic Control Unit) 300 as a control device, a current sensor 171, and a voltage sensor 172. The power reception section 110 includes a secondary self-resonance coil 111, a capacitor 112, and a secondary coil 113.

In this embodiment, a description will be made with an electric vehicle as an example of the vehicle 100. However, a configuration of the vehicle 100 is not limited to this but may be a configuration in which the vehicle can travel by use of the power stored in the power storage device. Other examples of the vehicle 100 include a hybrid vehicle in which an engine is installed and a fuel cell vehicle in which a fuel cell is installed.

The secondary self-resonance coil 111 receives the power from a primary self-resonance coil 221 included in the power transmission device 200 by electromagnetic resonance by use of the electromagnetic field.

The number of winding and an interval between coils of the secondary self-resonance coil 111 are appropriately set on the basis of the distance from the primary self-resonance coil 221 of the power transmission device 200, the resonance frequencies of the primary self-resonance coil 221 and the secondary self-resonance coil 111, and the like such that the Q value that represents the resonance strength between the primary self-resonance coil 221 and the secondary self-resonance coil 111 becomes large (for example, Q>100) and the coupling coefficient (κ) or the like that represents a degree of coupling becomes small (for example, 0.1 or smaller).

The capacitor 112 is connected to both ends of the secondary self-resonance coil 111 and forms an LC resonance circuit together with the secondary self-resonance coil 111. A capacitance of the capacitor 112 is appropriately set such that a prescribed resonance frequency is obtained according to an inductance of the secondary self-resonance coil 111. The capacitor 112 may be omitted in a case where an own stray capacitance of the secondary self-resonance coil 111 can provide a desired resonance frequency.

The secondary coil 113 is coaxially provided with the secondary self-resonance coil 111 and can magnetically be coupled to the secondary self-resonance coil 111 by the electromagnetic induction. The secondary coil 113 takes out the power that is received by the secondary self-resonance coil 111 by the electromagnetic induction and outputs the power to the rectifier 180.

The rectifier 180 rectifies alternate current power received from the secondary coil 113 and outputs the rectified direct current power to the power storage device 190 via the CHR 170. For example, the rectifier 180 can be configured to include a diode bridge and a smoothing capacitor (neither shown). A so-called switching regulator that performs rectification by using switching control can be used as the rectifier 180. However, because the rectifier 180 may be included in the power reception section 110, a stationary type rectifier such as the diode bridge is more preferably used to prevent an improper action of a switching element along with the generated electromagnetic field.

This embodiment is configured such that the direct current power rectified by the rectifier 180 is directly output to the power storage device 190. However, in a case where the direct current voltage after the rectification differs from a charging voltage that the power storage device can accept, a DC/DC converter (not shown) for voltage conversion may be provided between the rectifier 180 and the power storage device 190.

A load resistance 173 for positional detection and a relay 174 that are connected in series are connected to an output section of the rectifier 180. Before substantial charging is started, the power transmission device 200 transmits weak power as a test signal to the vehicle. Then, the relay 174 is controlled by a control signal SE3 from the vehicle ECU 300 and becomes a conduction state.

The voltage sensor 172 is provided between a pair of power lines that couple the rectifier 180 and the power storage device 190 together. The voltage sensor 172 detects a direct current voltage on the secondary side of the rectifier 180, that is, a voltage of the received power from the power transmission device 200 and outputs a detection value VC to the vehicle ECU 300. The vehicle ECU 300 makes a determination on power reception efficiency by the voltage VC and sends information about the power reception efficiency to the power transmission device via the communication section 160.

The current sensor 171 is provided on a power lines that couples the rectifier 180 and the power storage device 190 together. The current sensor 171 detects charging current to the power storage device 190 and outputs a detection value IC to the vehicle ECU 300.

The CHR 170 is electrically connected to the rectifier 180 and the power storage device 190. The CHR 170 is controlled by a control signal SE2 from the vehicle ECU 300 and switches supply and blockage of the power from the rectifier 180 to the power storage device 190.

The power storage device 190 is a power storing element that is configured to be capable of charging and discharging the power. The power storage device 190 is configured to include a secondary battery such as a lithium ion battery, a nickel-metal hydride battery, or a lead-acid battery or a power storage element such as an electric double-layer capacitor.

The power storage device 190 is connected to the rectifier 180 via the CHR 170. The power storage device 190 stores the power that is received by the power reception section 110 and rectified by the rectifier 180. Further, the power storage device 190 is connected to the PCU 120 via the SMR 115. The power storage device supplies the power for generating a vehicle driving force to the PCU 120. In addition, the power storage device 190 stores the power generated by the motor-generator 130. An output of the power storage device 190 is at approximately 200 V, for example.

Although neither shown, the power storage device 190 is provided with a voltage sensor and a current sensor for detecting a voltage VB of and current IB input or output to the power storage device 190. Those detection values are output to the vehicle ECU 300. The vehicle ECU 300 computes a charged state (also referred to as "SOC (State Of Charge)") of the power storage device 190 on the basis of the voltage VB and the current IB.

The SMR 115 is inserted in a power line that couples the power storage device 190 and the PCU 120 together. The SMR 115 is controlled by a control signal SE1 from the vehicle ECU 300 and switches supply and blockage of the power between the power storage device 190 and the PCU 120.

The PCU 120 includes a converter and an inverter although neither shown. The converter is controlled by a control signal PWC from the vehicle ECU 300 to convert the voltage from the power storage device 190. The inverter is controlled by a control signal PWI from the vehicle ECU 300 to drive the motor-generator 130 by using the power converted by the converter.

The motor-generator 130 is an alternate current rotary electric machine, for example, and is a permanent magnet type synchronous motor that includes a rotor with embedded permanent magnets.

Output torque of the motor-generator 130 is transmitted to the drive wheel 150 via the drive power transmission gear 140 to travel the vehicle 100. The motor-generator 130 can generate power by a rotational force of the drive wheel 150 during a regenerative braking operation of the vehicle 100. The generated power is converted to the power for charging the power storage device 190 by the PCU 120.

Further, in the hybrid vehicle in which the engine (not shown) other than the motor-generator 130 is installed, the engine and the motor-generator 130 are cooperatively operated to generate the required vehicle driving force. In this case, the power storage device 190 can be charged by using the generated power by the revolution of the engine.

As described above, the communication section 160 is the communication interface for performing radio communication between the vehicle 100 and the power transmission device 200. The communication section 160 outputs battery information INFO that includes the SOC of the power storage device 190 from the vehicle ECU 300 to the power transmission device 200. Further, the communication section 160 outputs signals STRT, STP that command the power transmission device 200 to start or stop the power transmission from the power transmission device 200 to the power transmission device 200.

The vehicle ECU 300 includes a CPU (Central Processing Unit), a memory device, and an input-output buffer although none shown, performs an input of a signal from each sensor or the like and an output of a control signal to each apparatus, and performs control of the vehicle 100 and each apparatus. These kinds of control are not limited to a process by software but can be processed by dedicated hardware (electric circuit).

When the vehicle ECU 300 receives a charging start signal TRG by an operation or the like by the user, the vehicle ECU 300 outputs to the power transmission device 200 the signal STRT that commands the power transmission device 200 to start the power transmission via the communication section 160 on the basis of satisfaction of a prescribed condition. Further, the vehicle ECU 300 outputs the signal STP that commands the power transmission device 200 to stop the power transmission to the power transmission device 200 via the communication section 160 on the basis of a fully charged state of the power storage device 190 or the operation or the like by the user.

The power transmission device 200 includes the charging stand 210 and the power transmission section 220. The charging stand 210 further includes a power transmission ECU 240 as a control device, the power source section 250, a display section 242, and the fee reception section 246 in addition to the communication section 230. Further, the power transmission section 220 includes the primary self-resonance coil 221, a capacitor 222, and a primary coil 223.

The power source section 250 is controlled by a control signal MOD from the power transmission ECU 240 and converts the power received from an alternate current power source such as a commercial power source to the high-frequency power. The power source section 250 supplies the converted high-frequency power to the primary coil 223.

Although FIG. 6 does not show a matching apparatus that performs impedance conversion, the matching apparatus may be provided between the power source section 250 and the power transmission section 220 or between the power reception section 110 and the rectifier 180.

The primary self-resonance coil 221 transfers the power to the secondary self-resonance coil 111 included in the power reception section 110 of the vehicle 100 by the electromagnetic resonance.

The number of winding and the interval between coils of the primary self-resonance coil 221 are appropriately set on the basis of the distance from the secondary self-resonance coil 111 of the vehicle 100, the resonance frequencies of the primary self-resonance coil 221 and the secondary self-resonance coil 111, and the like such that the Q value that represents the resonance strength between the primary self-resonance coil 221 and the secondary self-resonance coil 111 becomes large (for example, Q>100) and the coupling coefficient (κ) or the like that represents the degree of coupling becomes small (for example, 0.1 or smaller).

The capacitor 222 is connected to both ends of the primary self-resonance coil 221 and forms the LC resonance circuit together with the primary self-resonance coil 221. The capacitance of the capacitor 222 is appropriately set such that a prescribed resonance frequency is obtained according to the inductance of the primary self-resonance coil 221. The capacitor 222 may be omitted in a case where the own stray capacitance of the primary self-resonance coil 221 can provide a desired resonance frequency.

The primary coil 223 is coaxially provided with the primary self-resonance coil 221 and can magnetically be coupled to the primary self-resonance coil 221 by the electromagnetic induction. The primary coil 223 transmits the high-frequency power supplied via a matching apparatus 260 to the primary self-resonance coil 221 by the electromagnetic induction.

As described above, the communication section 230 is the communication interface for performing the radio communication between the power transmission device 200 and the vehicle 100. The communication section 230 receives the battery information INFO sent from the communication section 160 on the vehicle 100 side and the signals STRT, STP that command to start and stop the power transmission and outputs the information to the power transmission ECU 240.

Cash, a stored-value card, a credit card, or the like is inserted in the fee reception section 246 prior to the charging. The power transmission ECU 240 makes the power source section 250 send a test signal with weak power. The vehicle ECU 300 sends the control signals SE2, SE3 to make the relay 174 an ON state and make the CHR 170 an OFF state in order to receive the test signal. The vehicle ECU 300 calculates the power reception efficiency and charging efficiency on the basis of the voltage VC. The vehicle ECU 300 sends the calculated charging efficiency or the power reception efficiency to the power transmission device 200 by the communication section 160.

The display section 242 of the power transmission device 200 displays the charging efficiency and a unit charged power price corresponding thereto to the user. The display section 242 has a function as an input section like a touch panel, for example, and can receive an input about whether or not the user approves the unit charged power price.

The power transmission ECU 240 makes the power source section 250 start the substantial charging if the unit charged power price is approved. Payment for the fee is made in the fee reception section 246 when the charging is complete.

The power transmission ECU 240 includes a CPU (Central Processing Unit), a memory device, and an input-output buffer although none shown, performs an input of a signal from each sensor or the like and an output of a control signal to each apparatus, and performs control of each apparatus in the charging stand 210. These kinds of control are not limited to a process by software but can be processed by dedicated hardware (electric circuit).

FIG. 7 is a diagram of a first example for illustrating nonuniformity in received power.

FIG. 8 is a diagram of a second example for illustrating nonuniformity in the received power.

The first example shown in FIG. 7 illustrates an example of a vehicle 100A with high power reception efficiency. When the power reception efficiency is 100%, for example, if the power transmitted from the power transmission section 220 of the power transmission device 200 is 100, the power received by a power reception section 110A of the vehicle 100A is also 100.

On the other hand, the second example shown in FIG. 8 illustrates an example of a vehicle 100B with low power reception efficiency. When the power reception efficiency is 66.6%, for example, the power transmitted from the power transmission section 220 of the power transmission device 200 becomes 150 in order to make the power received by the power reception section 110E become 100.

It is considered that factors in such a change in the power reception efficiency or the charging efficiency are differences in the power reception or charging efficiency of devices (power reception sections, power storage devices) installed in the vehicles, differences in a stop position and aging degradation of the same vehicle, and differences in environmental conditions (road surface condition, temperature), for example.

FIG. 9 is a graph for illustrating evaluation examples of a unit charge price. Setting of the unit charge price as shown in FIG. 9 is based on a concept that the fee is paid for the power that is used by the charging stand side.

For example, in a case where the charging efficiency changes from E2 to E1 according to the road surface condition, the temperature, or the like, the user may think that the change is unreasonable because the fee to pay is different even when the same charging amount is charged to the vehicle. A certain agreement is required between the user and a business operator to reduce such dissatisfaction.

In addition, a charging cost may be changed according to a difference in a power supply device. For example, the charging cost may be set more reasonable than a usual price in a place close to a power plant (a place with high power transmission efficiency), a place where an additional solar power generator is usable, and a place with an additional storage battery that stores night-time power.

FIG. 10 is a first diagram for illustrating the unit charge price that is applied in this embodiment.

Figure 11:
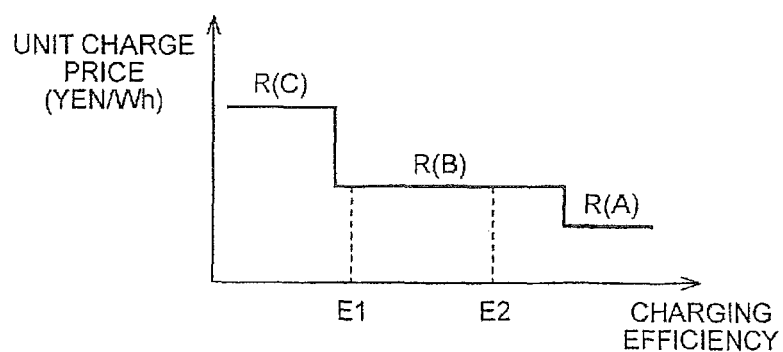
FIG. 11 is a second diagram for illustrating the unit charge price that is applied in this embodiment.

FIG. 11 is a second diagram for illustrating the unit charge price that is applied in this embodiment.

In FIG. 10, the unit charge price is set to 0.020 yen/Wh for a rank R(A) where the charging efficiency is 90% or higher. Further, the unit charge price is set to 0.025 yen/Wh for a rank R(B) where the charging efficiency is 80% or higher and lower than 90%. Moreover, the unit charge price is set to 0.030 yen/Wh for a rank R(C) where the charging efficiency is lower than 80%.

When a graph is drawn as shown in FIG. 11, the plurality of ranks R(A), R(B), R(C) that correspond to the collected fees are defined corresponding to a plurality of power reception efficiency ranges that differ from each other. The power reception efficiency of the vehicle is obtained from the vehicle side, the rank corresponding to the obtained power reception efficiency is determined from the plurality of ranks by the charging stand, and the fee is billed on the basis of the rank.

For example, even if the power reception efficiency is nonuniform as E1 and E2, they belong to the same rank R(B), and the unit charge price is set the same. Accordingly, the dissatisfaction of the user about the charging cost is reduced.

Figure 12:
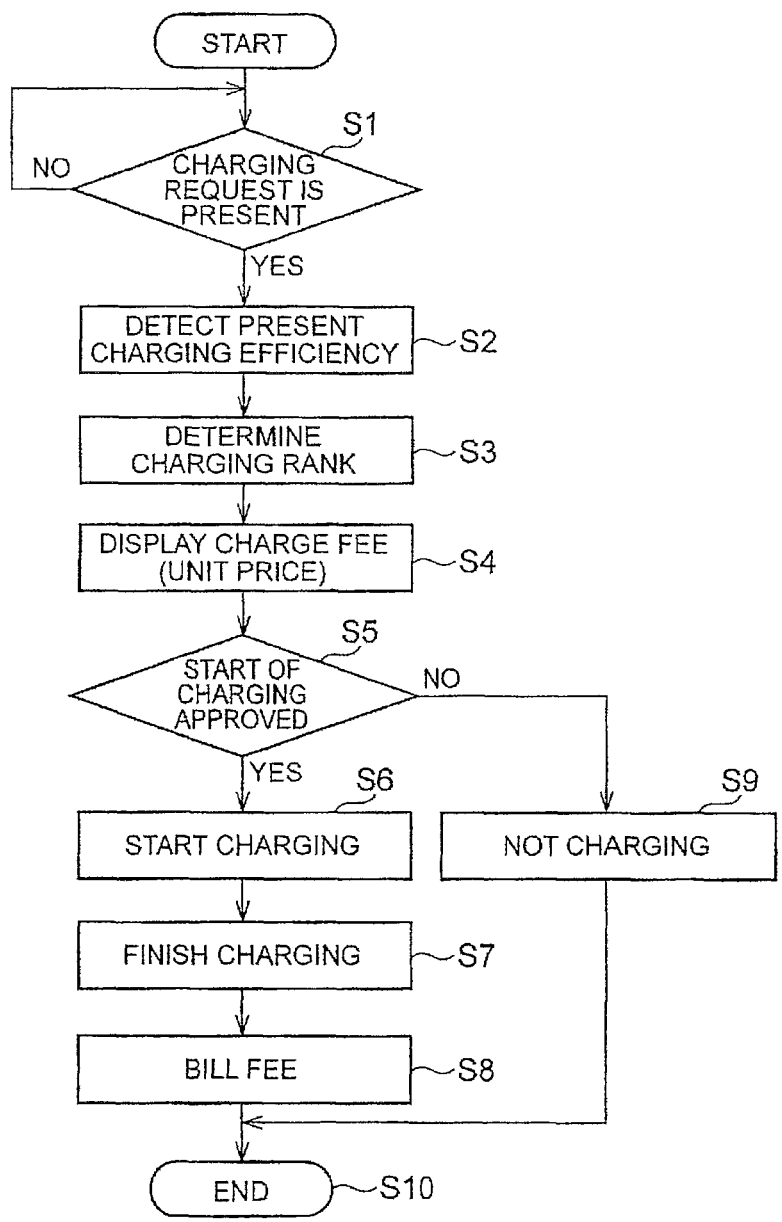
FIG. 12 is a flowchart for illustrating control that is executed by the power transmission device.

FIG. 12 is a flowchart for illustrating control that is executed by the power transmission device.

Referring to FIG. 6 and FIG. 12, when a process is started, a determination is first made in step S1 whether or not there is a charging request from the user. The charging request is detected by the power transmission ECU 240 when a button that indicates the charging request displayed on the display section 242 is pressed after the vehicle is parked at a prescribed position, for example. In a case where the alignment is performed by using a power reception level or a sensor, a determination that there is the charging request may be made according to a completion of the alignment.

The process proceeds to step S2 if the charging request is detected in step S1. In step S2, a temporary power transmission (sending of a weak test signal) is executed, the vehicle ECU 300 detects the present power reception efficiency, and information about the power reception efficiency is sent to the power transmission device 200 by the communication section 160. The sent information is obtained by the power transmission ECU 240. The power reception efficiency may be obtained by the vehicle side and may be computed by the power transmission ECU 240 on the basis of the information from the vehicle side.

In step S2, actual power transmission may not be executed. For example, the vehicle may send information about the charging efficiency on the basis of a cumulative power reception record. Further, in a case of contactless power supply or the like, the charging efficiency may be estimated by detecting the vehicle stop position.

Moreover, the power transmission ECU 240 may obtain any of the power reception efficiency in execution of temporary energization, a mismatch amount between the power transmission section 220 and the power reception section 110 in a case where contactless charging is performed, presence or absence of an object interposed between the power transmission section 220 and the power reception section 110 in a case where the contactless charging is performed, and aging degradation information about the vehicle and may thereby calculate the power reception efficiency in power supply on the basis on the obtained information.

The mismatch amount or presence or absence of the object can be detected by a sensor. The aging degradation information may be obtained by obtaining a result of counting of an elapsed time from a time when the vehicle was new by the vehicle side. The start-of-use date is stored in a memory, present year, month, and day is obtained from a built-in clock or by communication, start-of-use year, month, and day are subtracted from the present year, month, and day, and the elapsed time may thereby be calculated.

A relationship between these kinds of information and a change in the charging efficiency is stored in a previously and experimentally obtained map, and the charging efficiency may be estimated or calculated by referring to the map when the information is obtained.

Next, in step S3, as shown in FIG. 10 and FIG. 11, the power transmission ECU 240 determines the rank corresponding to the information about the obtained power reception efficiency from the plurality of ranks R(A), R(B), R(C) that are previously defined corresponding to the collected fee. The plurality of ranks shown in FIG. 10 and FIG. 11 are defined corresponding to the plurality of power reception efficiency ranges that differ from each other, and any one of the ranks is selected corresponding to the power reception efficiency. Here, the rank may include any of the fee, the unit price, and a total price for full charging.

In step S4, the power transmission ECU 240 makes the display section 242 display the unit price of a corresponding charge fee on the basis of the determined rank in step S3. At this point, the present SOC or a possible storage capacity of the power storage device 190 is obtained, the charge fee for the fully charged state is calculated, and an expected charge fee price may thereby be displayed along with the unit price.

In step S5, an inquiry is made whether or not the user approves the power supply to the vehicle at the unit charge price displayed on the display section 242. For example, an indication of "would you like power supply at the displayed unit price?" is displayed on the display section 242, or an inquiry of "would you like power supply at the displayed unit price?" is output by a voice from a speaker, and selection buttons of "OK" and "stop charging" are then displayed on the display section 242.

If a start of the charging is approved in step S5, the process proceeds to step S6, and the charging is started. When the charging is finished in step S7, a fee billing process (a withdrawal from the stored-value card, return of change for entered cash, or the like) is executed in step S8, and the process is finished in step S10.

On the other hand, if the user does not approve the start of charging in step S5, for example, the user has pressed the stop charging button, the process proceeds to step S9, and no charging is performed. The process is thereafter finished in step S10.

After the process is finished in step S10, the power transmission ECU 240 becomes a waiting state for the charging request in step S1 by a next user.

As described above, in this embodiment, a power fee (charging cost) with a certain width of the charging efficiency is set, the nonuniformity in a power reception cost or the charging cost to the user can thereby be reduced.

In the above-described example, the control device on the power supply device side performs the processes such as the detection of the power reception efficiency, the determination of a charging rank, and the display of the charge fee. However, a portion or all of those processes may be performed by the ECU 300 on the vehicle side. For example, when the ECU on the vehicle side obtains a relationship between the previously defined charging rank and the fee, after the present charging efficiency is detected in step S2, the determination of the charging rank in step S3 and the process of displaying the charge fee can be performed on the vehicle side.

A charging command may be performed from the vehicle side, the charging command may be performed by a controller-like apparatus, or the charging command may be performed from a portable terminal apparatus.

Further, as described above, in the power transmission-reception system in accordance with this embodiment, the power is transmitted from the power transmission section to the power reception section by making the power transmission section and the power reception section resonate with each other by the electromagnetic field. Such coupling between the power transmission section and the power reception section in the power transmission is referred to as "magnetic resonance coupling", "magnetic field (magnetic field) resonance coupling", "electromagnetic field (electromagnetic field) resonance coupling", or "electric field (electric field) resonance coupling".

The "electromagnetic field (electromagnetic field) resonance coupling" means coupling that includes any of the "magnetic resonance coupling", "magnetic field (magnetic field) resonance coupling", and "electric field (electric field) resonance coupling".

The power transmission section and the power reception section that are described in this specification employ coil-shaped antennae. Therefore, the power transmission section and the power reception section are mainly coupled together by the magnetic field (magnetic field), and the power transmission section and the power reception section are coupled together by the "magnetic resonance coupling" or the "magnetic field (magnetic field) resonance coupling".

For example, the antenna such as a meander line antenna can be employed as the power transmission section and the power reception section. In such a case, the power transmission section and the power reception section are mainly coupled together by the electric field (electric field). In this case, the power transmission section and the power reception section are coupled by the "electric field (electric field) resonance coupling".

Further, in this embodiment, a case is exemplified where a power transmission unit and a power reception unit include electromagnetic induction coils. However, the present invention can be applied to a case where either one or both of the power transmission unit and the power reception unit do not include the electromagnetic induction coil (a resonance type contactless power transmission-reception device that only uses the self-resonance coil).

MODIFICATION EXAMPLES

Figure 13:
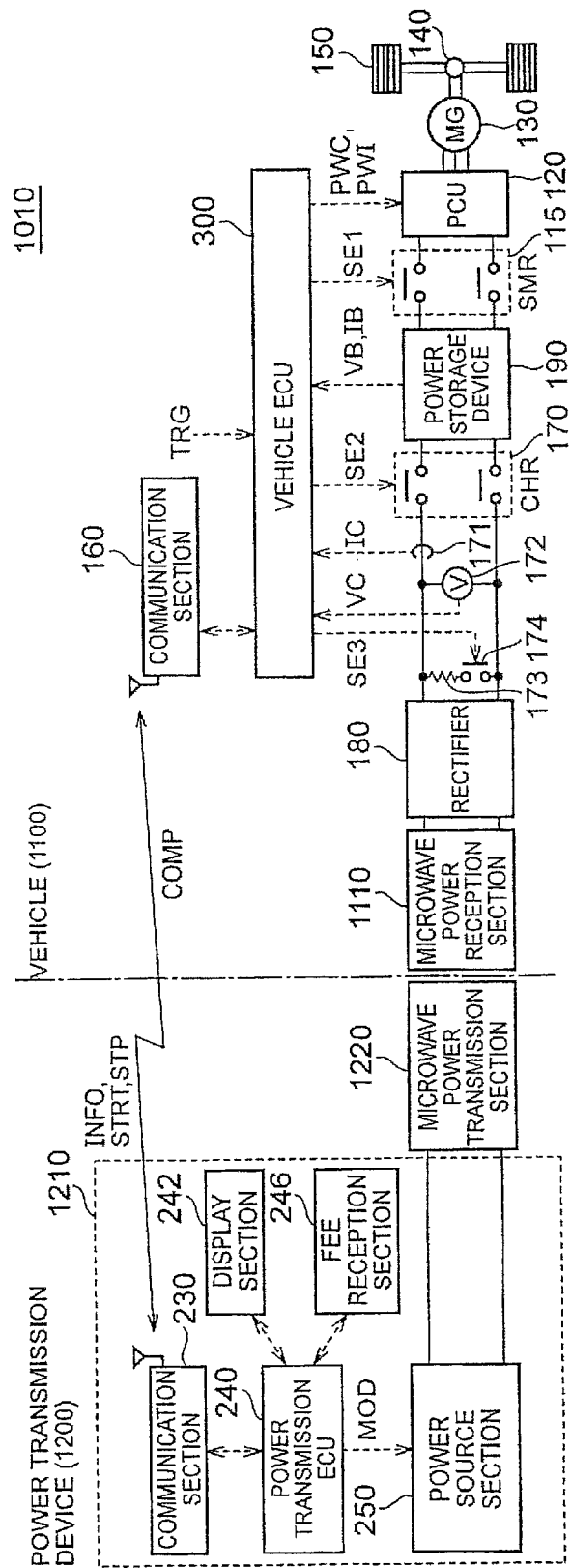
FIG. 13 is a diagram for illustrating a first modification example.

FIG. 13 is a diagram for illustrating a first modification example. Referring to FIG. 13, a power transmission-reception system 1010 of the first modification example includes a power transmission device 1200 and a vehicle 1100. The power transmission device 1200 performs power supply to the vehicle 1100 by a microwave.

The power transmission device 1200 includes a charging stand 1210 and a microwave power transmission section 1220. The charging stand 1210 has a similar configuration to the charging stand 210 illustrated in FIG. 6, and a description thereof will not be repeated.

The vehicle 1100 includes a microwave power reception section 1110 instead of the power reception section 110 in a configuration of the vehicle 100 illustrated in FIG. 6. A configuration of other sections of the vehicle 1100 is similar to that of the vehicle 100, and a description thereof will not be repeated.

The control illustrated in FIG. 10 to FIG. 12 can be applied to the power transmission-reception system 1010 that performs contactless power transmission-reception by the microwave as shown in FIG. 13.

Figure 14:
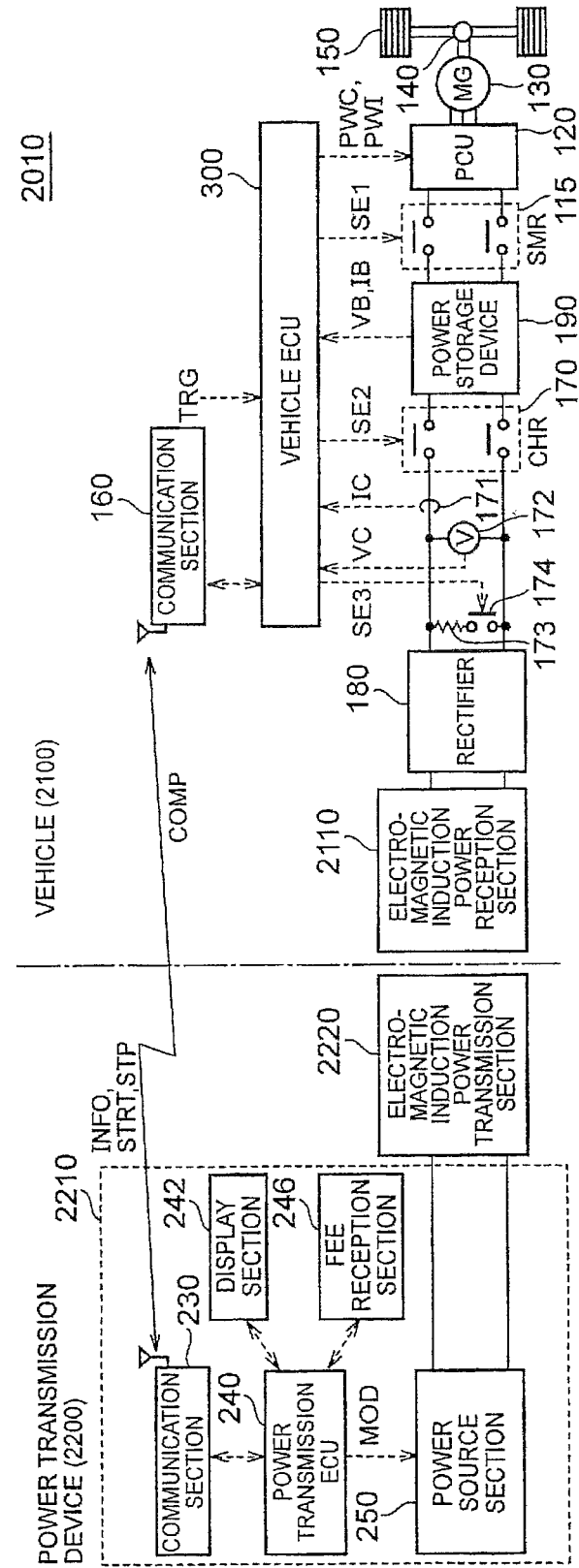
FIG. 14 is a diagram for illustrating a second modification example.

FIG. 14 is a diagram for illustrating a second modification example. Referring to FIG. 14, a power transmission-reception system 2010 of the second modification example includes a power transmission device 2200 and a vehicle 2100. The power transmission device 2200 performs power supply to the vehicle 2100 by the electromagnetic induction.

The power transmission device 2200 includes a charging stand 2210 and an electromagnetic induction power transmission section 2220. The charging stand 2210 has a similar configuration to the charging stand 210 illustrated in FIG. 6, and a description thereof will not be repeated.

The vehicle 2100 includes an electromagnetic induction power reception section 2110 instead of the power reception section 110 in the configuration of the vehicle 100 illustrated in FIG. 6. A configuration of other sections of the vehicle 2100 is similar to the vehicle 100, and a description thereof will not be repeated.

The control illustrated in FIG. 10 to FIG. 12 can be applied to the power transmission-reception system 1010 that performs contactless power transmission-reception by the electromagnetic induction as shown in FIG. 14.

Figure 15:
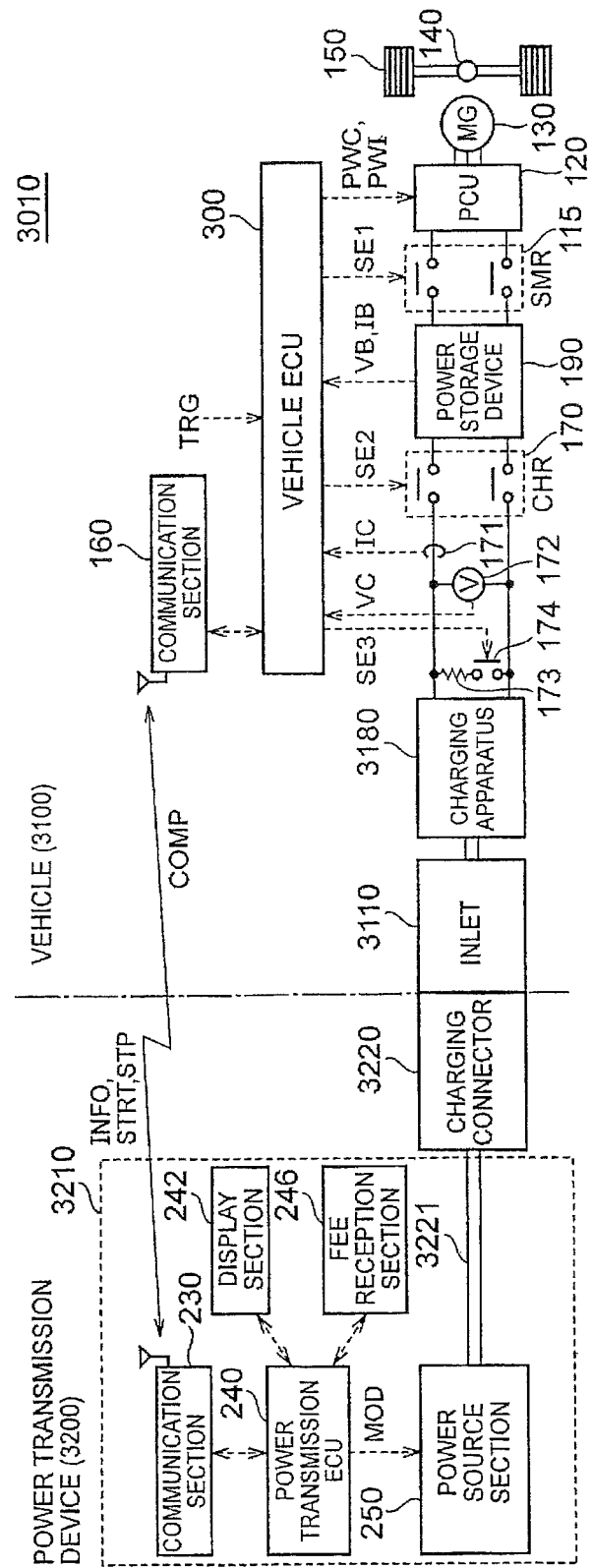
FIG. 15 is a diagram for illustrating a third modification example.

FIG. 15 is a diagram for illustrating a third modification example. Referring to FIG. 15, a power transmission-reception system 3010 of the third modification example includes a power transmission device 3200 and a vehicle 3100. The power transmission device 3200 performs power supply to the vehicle 3100 by connection with a charging cable.

The power transmission device 3200 includes a charging stand 3210, a charging cable 3221, and a charging connector 3220. The charging stand 3210 has a similar configuration to the charging stand 210 illustrated in FIG. 6, and a description thereof will not be repeated.

The vehicle 3100 includes an inlet 3110 to which the charging connector 3220 is connected instead of the power reception section 110 in the configuration of the vehicle 100 illustrated in FIG. 6. A configuration of other sections of the vehicle 3100 is similar to the vehicle 100, and a description thereof will not be repeated.

The control illustrated in FIG. 10 to FIG. 12 can be applied to the power transmission-reception system 3010 that performs power reception by plug-in charging as shown in FIG. 15. Accordingly, the nonuniformity in the power reception cost to the user can be reduced even when the charging efficiency fluctuates to some extent due to the aging degradation, temperature fluctuation, or the like.

A description has been made with an example of the charging in this embodiment described above. However, the present invention can be applied to a case where the received power is used for a purpose other than the charging. For example, the nonuniformity in the power reception cost can also be reduced in a case where the received power is used to drive loads such as auxiliary apparatuses of the vehicle.

It should be understood that the embodiment disclosed herein is illustrative in all aspects and does not limit the present invention. It is intended that the scope of the present invention be defined not by the above description but by the claims and the present invention include all modifications within meanings equivalent to the claims and the scope thereof.

DESCRIPTION OF REFERENCE NUMERALS AND SYMBOLS 10, 1010, 2010, 3010: POWER TRANSMISSION-RECEPTION SYSTEM
100, 100A, 100B, 1100, 2100, 3100: VEHICLE
91, 110, 110A, 110B: POWER RECEPTION SECTION
111, 340: SECONDARY SELF-RESONANCE COIL
112, 222: CAPACITOR
113, 350: SECONDARY COIL
130: MOTOR-GENERATOR
140: DRIVE POWER TRANSMISSION GEAR
150: DRIVE WHEEL
160, 230: COMMUNICATION SECTION
171: CURRENT SENSOR
172: VOLTAGE SENSOR

173: LOAD RESISTANCE
174: RELAY
180: RECTIFIER
190: POWER STORAGE DEVICE
200, 1200, 2200, 3200: POWER TRANSMISSION DEVICE
210, 1210, 2210, 3210: CHARGING STAND
90, 220, 240: POWER TRANSMISSION SECTION
221, 330: PRIMARY SELF-RESONANCE COIL
223, 320: PRIMARY COIL
240: POWER TRANSMISSION ECU
242: DISPLAY SECTION
246: FEE RECEPTION SECTION
250: POWER SOURCE SECTION
260: MATCHING APPARATUS
300: VEHICLE ECU
310: HIGH-FREQUENCY POWER SOURCE
360: LOAD
1110: MICROWAVE POWER RECEPTION SECTION
1220: MICROWAVE POWER TRANSMISSION SECTION
2110: ELECTROMAGNETIC INDUCTION POWER RECEPTION SECTION
2220: ELECTROMAGNETIC INDUCTION POWER TRANSMISSION SECTION
3110: INLET
3220: CHARGING CONNECTOR
3221: CHARGING CABLE
PCU: POWER CONTROL UNIT

The invention claimed is:

1. A power supply device which performs power supply from an outside to a vehicle, the power supply device comprising:
a power source configured to perform the power supply to the vehicle; and
a control device that performs control of the power source,
wherein the control device receives a charging request from the vehicle after the vehicle is parked at a prescribed position, the control device transmits power to the vehicle, and
the control device obtains, from the vehicle, information about power reception efficiency of charging started in response to the charging request from the vehicle as an object of the power supply, and the control device determines a power reception efficiency range and a fee that correspond to the obtained information from a plurality of power reception efficiency ranges and a plurality of fees that are set corresponding to the plurality of power reception efficiency ranges.

2. The power supply device according to claim 1, further comprising a power transmitter configured to receive the power from the power source and contactlessly performing power transmission to the vehicle.

3. The power supply device according to claim 2, wherein the power transmitter is configured such that a difference in a natural frequency from a power receiver of the vehicle falls within ±10%.

4. The power supply device according to claim 2, wherein a coupling coefficient between a power receiver of the vehicle and the power transmitter is 0.1 or smaller.

5. The power supply device according to claim 2, wherein the power transmitter transmits the power to the power receiver through either one of a magnetic field that is formed between the power receiver of the vehicle and the power transmitter and vibrates at a specified frequency and an electric field that is formed between the power receiver and the power transmitter and vibrates at a specified frequency.

6. The power supply device according to claim 1, wherein the control device obtains, as the information, any of power reception efficiency in execution of temporary energization, a mismatch amount between a power and a power receiver in a case where contactless charging is performed, presence or absence of an object interposed between the power transmitter and the power receiver in a case where the contactless charging is performed, and aging degradation information about the vehicle and calculates power reception efficiency in power supply according to the obtained information.

7. The power supply device according to claim 1, wherein the control device informs an operator of the vehicle of the determined fee.

8. The power supply device according to claim 1, wherein the control device informs an operator of the vehicle of the determined fee, starts the power supply to the vehicle if the operator of the vehicle approves the determined fee, and stops the power supply to the vehicle if the operator of the vehicle does not approve the determined fee.

9. A power supply method of performing power supply to a vehicle from a power supply device that performs power supply from an outside to the vehicle, the power supply method comprising:
transmitting a charging request from the vehicle to the power supply device when a user performs a prescribed operation after the vehicle is parked;
transmitting power from the power supply device to the vehicle when the power supply device receives the charging request;
transmitting information about power reception efficiency of the transmitted power from the vehicle to the power supply device;
obtaining information about power reception efficiency of the vehicle as an object of the power supply; and
determining a power reception efficiency range and a fee that correspond to the obtained information from a plurality of power reception ranges and a plurality of fees that are set corresponding to the plurality of power reception efficiency ranges.

* * * * *